1,936,572

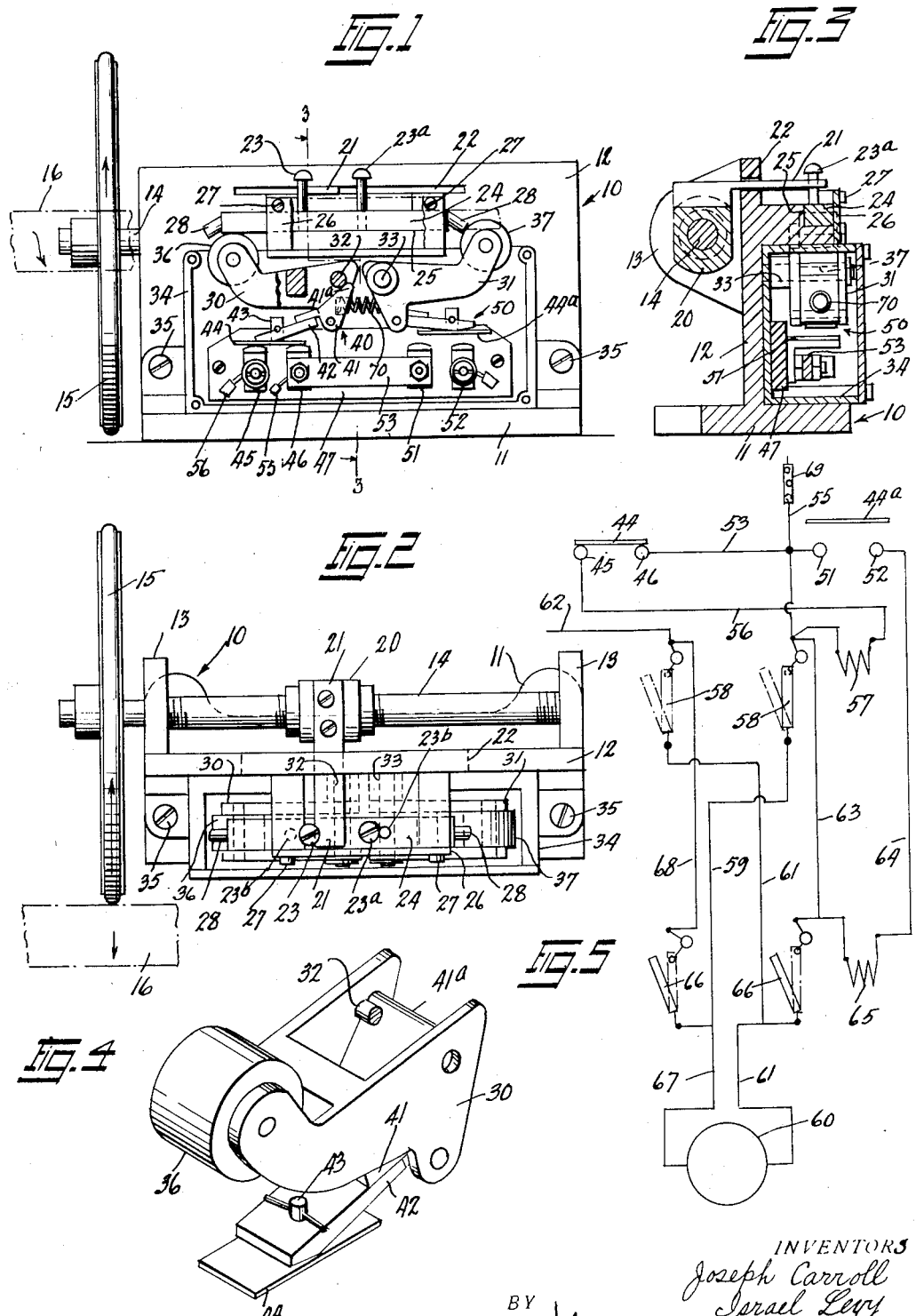
Nov. 28, 1933. J. CARROLL ET AL 1,936,572
MOTOR REVERSING MECHANISM
Filed Aug. 18, 1932
INVENTORS
Joseph Carroll
Israel Levy
BY Maurice Block
ATTORNEY Patented Nov. 28, 1933

UNITED STATES PATENT OFFICE 1,936,572

MOTOR REVERSING MECHANISM

Joseph Carroll and Israel Levy, Brooklyn, N. Y.

Application August 18, 1932. Serial No. 629,322

6 Claims. (Cl. 200—47)

This invention relates to motor reversing mechanisms, and has for one of its objects the provision of a device of this character which may be connected to any motor driven machine as by gearing, belting or by frictional engagement therewith, so as to reverse the direction of rotation of the said machine at pre-determined intervals.

Another object of the invention is to provide adjustable means whereby the duration of rotation of the motor and the machine controlled thereby in a given direction may be increased or diminished as required.

A further object of the invention is to provide a device of this character which will be inexpensive to manufacture and will not easily get out of order.

Another object is to produce a device of the character described in which the maximum simplicity of construction and operation is secured.

Other objects and advantages will appear as the nature of the improvements is better understood, the invention consisting substantially in the novel arrangement and co-relation of parts herein fully described, and illustrated in the accompanying drawing, wherein similar reference characters are used to describe corresponding parts throughout the several views, and then finally pointed out and specifically defined and indicated in the appended claims.

The disclosure made the basis of exemplifying the present inventive concept suggests a practical embodiment thereof, but the invention is not to be restricted to the exact details of this disclosure, and the latter, therefore, is to be understood from an illustrative, rather than a restrictive standpoint.

The inventive idea involved is capable of receiving a variety of mechanical expressions, one of which, for the purpose of illustration, is shown in the accompanying drawing, in which Figure 1 is a front view in elevation of our improved reversing mechanism with parts broken away therefrom for the sake of clarity.

Figure 2 is a top plan view thereof.

Figure 3 is a sectional view taken on line 3—3 Fig. 1.

Figure 4 is a perspective view of a portion of the circuit making and breaking mechanism, and Figure 5 is a diagrammatic view of the electrical connections.

Up to the present time in order to reverse the direction of rotation of machinery requiring such reversals, it has been the custom either to employ some one to throw in and out various switches at given intervals or to design and use very expensive devices. This of course greatly added to the cost of production. In order to obviate this added expense and yet accomplish the required result in an efficient and precise manner, we have perfected our improved reversing mechanism.

Referring now to the drawing in detail 10 indicates a support or bracket having a base 11 and a vertical wall 12 which is provided with a pair of bearings or ears 13 in which there is rotatably journalled a screw threaded shaft 14 to which there is secured a wheel 15, shown in the present instance as in frictional engagement with a shaft 16 extending from a motor driven machine not shown. It may be here stated that this wheel 15 may be directly in contact with the motor shaft or any shaft driven from the said motor, and instead of a frictional drive, gearing or a pulley and belt drive may be employed.

Mounted on the said screw threaded shaft 14 there is an internally threaded block 20 to which there is secured a plate 21 which extends forwardly through a slot 22 in the bracket wall 12 and into the path of a pair of screws 23 and 23a extending from a slide bar 24 slidingly maintained in a slideway 25 at the front of the wall 12. The said slidebar 24 is maintained in the slideway 25 by means of a plate 26 secured in place by screws 27.

The slidebar 24 is provided at each end thereof with an angular projection 28 the object of which will presently be described. Directly below the slideway 25 there are a pair of bifurcated levers 30 and 31 which are identical in construction and are pivotally mounted on pins or studs 32 and 33 respectively secured in a housing 34 which is in turn secured by means of screws 35 to the bracket 10. The said levers 30 and 31 are provided at their forward ends with rotatable rollers 36 and 37 respectively.

The lever 30 has at the lower end thereof a circuit making or breaking mechanism 40 comprising a pivotally mounted lever 41 to which is secured an insulating block or plate 42 pivotally carrying a pin 43 to the lower end of which there is secured a contact plate 44 adapted to span and contact with a pair of electric terminals 45 and 46 insulated from each other by an insulating bar 47 secured to the rear wall of the housing 34. The lever 31 is provided with a circuit making and breaking mechanism 50, which is identical in construction to the construction of the mechanism 40 and terminates in a contact plate 44a which when the lever 31 is depressed in a manner to be presently described, will span and contact with a pair of electric terminals 51 and 52. A plate or bar 53 connects the terminals 46 and 51.

In Figures 1 and 2 the shaft 14 is shown as being driven in clockwise direction by the shaft 16, in this position the lever 30 is depressed by means of the slide bar 24 exerting a pressure upon the roller 36, thus bringing the plate 44 down upon the terminals 45 and 46 causing the current to flow through the lead wires 55, 56 and energize a magnet 57 (Figure 5) which closes a switch 58—58 the current passing through a lead line 59 into a motor 60 and out therefrom by way of a lead wire 61 to a return lead 62. As heretofore stated, with the parts in the above named position the shaft 14 is driven in clockwise direction causing the block 20 and finger plate 21 to travel to the right. When the said plate 21 reaches the screw 23a the slide 24 is moved to the right, the projection 28 at the right hand side thereof will exert a pressure upon the roller 37 and swing the lever 31 which carries the circuit maker and breaker 50 downwardly until the plate 44a spans the terminals 51 and 52. This causes the current to flow through the leads 55—63 and 64 to energize a magnet 65 which closes the switch 66—66 and sends the current through the lead 61 into the motor 60 and out thereof through lead wires 67—68 to the return wire 62, causing the motor to reverse its direction of rotation and move the plate 21 from right to left to again reverse the direction of rotation when the circuit maker and breaker 40 is lowered to contact with the contacts 45 and 46. A main switch 69 is provided for starting and stopping the motor 60.

It will of course be understood that when either one or the other of the levers 30 or 31 and its circuit breaker is depressed the other of the said levers and circuit breaker will be raised by the pressure of a coiled spring 70 anchored in the pivotal levers 41 and exerting a tension between them to hold their upper ends 41a against the pins 32 and 33. It will also be seen that this arrangement provides a resilient contact between the plates 44 and 44a and their respective terminals.

The duration of rotation of the motor as well as the machine driven thereby may be increased or diminished by bringing the screws 23 and 23a further apart or closer together as required. To accomplish this there are provided a plurality of screw threaded openings 23b in the slide bar 24.

From the foregoing, it will be seen that we have provided a simple yet efficient and positive acting reversing mechanism adapted to be used in connection with various types of motor driven machines.

Having described our invention what we claim as new and desire to secure by Letters Patent is:

1. A motor reversing mechanism, comprising a pair of circuit makers, each of the said circuit makers comprising a pivotally mounted lever, a second lever pivotally mounted on the first mentioned lever, and a contact plate pivotally carried by the said second mentioned lever, a spring exerting a pressure between the said circuit makers, a rotatable shaft, a slide bar, a plate on the shaft in operative engagement with the said bar and adapted to slide on the said shaft when the shaft is rotated to slide the bar to alternately engage the said circuit makers, and a pair of electric terminals for each of the said circuit makers.

2. A motor reversing mechanism, comprising a pair of pivotally mounted circuit makers, a spring exerting a pressure between the said circuit makers, a rotatable shaft, a slide bar, a plate on the shaft in operative engagement with the said bar and adapted to slide on the said shaft when the shaft is rotated to slide the bar to alternately engage the said circuit makers, a pair of electric terminals for each of the said circuit makers and a pivotally mounted contact plate carried by each of the circuit makers.

3. A motor reversing mechanism, comprising a pair of pivotally mounted levers, a secondary lever pivotally mounted on each of the first mentioned levers, a contact plate carried by each of the said secondary levers, a pair of electric terminals for each of the said contact plates, a stop for each of the said secondary levers, a spring pressing the said secondary levers against the stops, a roller carried by each of the first mentioned levers, a slide bar, a screw threaded rotatable shaft, and a plate carried by the said shaft and adapted to slide thereon when the shaft is rotated, the said plate being in operative engagement with the slide bar to alternately engage each of the said rollers to depress the first mentioned levers to alternately bring the contact plates into engagement with their respective terminals.

4. A motor reversing mechanism, comprising a pair of pivotally mounted levers, a secondary lever pivotally mounted on each of the first mentioned levers, a contact plate carried by each of the said secondary levers, a pair of electric terminals for each of the said contact plates, a stop for each of the said secondary levers, a spring pressing the said secondary levers against the stops, a roller carried by each of the first mentioned levers, a slide bar, a screw threaded shaft adapted to be rotated first in one direction and then in the opposite direction and a plate in operative engagement with the slide bar carried by the said shaft and adapted to have a to and fro sliding movement thereon to depress first one of the said first mentioned levers and then the other to alternately bring the plates into engagement with their respective terminals.

5. A motor reversing mechanism, comprising a pair of pivotally mounted circuit makers, a spring exerting a pressure between the said circuit makers, a rotatable shaft, a slide bar, a pair of projections laterally adjustable on the said bar, a plate on the said shaft arranged to have a to and fro sliding movement thereon to alternately engage each of the said projections when the shaft is rotated to slide the bar into alternate engagement with the said circuit makers to depress same against their respective terminals, and a contact plate pivotally carried by each of the said circuit makers.

6. A switch for a motor reversing mechanism comprising a pivotally mounted main lever, a roller at one end thereof, a secondary lever pivotally mounted at the opposite end of the main lever, a contact plate pivotally carried by the secondary lever, a pair of electric terminals, movable means for periodically swinging the said main lever to bring the plate in contact with the said terminals, and a spring for maintaining the roller in operative engagement with the movable means.

JOSEPH CARROLL.
ISRAEL LEVY.